(12) United States Patent
Chakravarti et al.

(10) Patent No.: US 7,829,632 B2
(45) Date of Patent: Nov. 9, 2010

(54) POLYESTER POLYCARBONATE COMPOSITIONS, METHODS OF MAKING, AND ARTICLES FORMED THEREFROM

(75) Inventors: Shreyas Chakravarti, Evansville, IN (US); Bernardus Antonius Gerardus Schrauwen, Tilburg (NL); Robert Dirk van de Grampel, Tholen (NL)

(73) Assignee: Sabic Innovative Plastics IP B.V. (NL)

( * ) Notice: Subject to any disclaimer, the term of this patent is extended or adjusted under 35 U.S.C. 154(b) by 81 days.

(21) Appl. No.: 11/741,835

(22) Filed: Apr. 30, 2007

(65) Prior Publication Data

US 2008/0269400 A1    Oct. 30, 2008

(51) Int. Cl.
C08L 75/00 (2006.01)
C08L 37/00 (2006.01)
C08F 8/00 (2006.01)

(52) U.S. Cl. .................. 525/182; 525/191; 525/131

(58) Field of Classification Search ............... 525/182, 525/191, 131
See application file for complete search history.

(56) References Cited

U.S. PATENT DOCUMENTS

| | | | |
|---|---|---|---|
| 4,113,692 A | 9/1978 | Wambach | |
| 4,226,961 A | 10/1980 | Motz | |
| 4,246,381 A | 1/1981 | Robeson | |
| 4,677,150 A | 6/1987 | Chacko et al. | |
| 5,223,572 A | 6/1993 | Eckel et al. | |
| 5,310,793 A | 5/1994 | Freitag et al. | |
| 5,321,114 A | 6/1994 | Fontana et al. | |
| 6,066,694 A | 5/2000 | Chisholm et al. | |
| 6,476,158 B1 | 11/2002 | England et al. | |
| 6,538,065 B1 * | 3/2003 | Suriano et al. | 525/182 |
| 6,559,270 B1 | 5/2003 | Siclovan et al. | |
| 6,572,956 B1 | 6/2003 | Pickett et al. | |
| 6,583,256 B2 * | 6/2003 | Vollenberg et al. | 528/196 |
| 6,838,518 B2 | 1/2005 | Seidel et al. | |
| 6,949,599 B2 | 9/2005 | Vollenberg et al. | |
| 7,087,682 B2 | 8/2006 | Tadros et al. | |
| 7,109,274 B2 | 9/2006 | Acar et al. | |
| 2002/0132889 A1 | 9/2002 | Penning et al. | |
| 2005/0101757 A1 | 5/2005 | Glasgow et al. | |
| 2005/0158561 A1 | 7/2005 | Wang et al. | |
| 2006/0100394 A1 | 5/2006 | Hale | |

FOREIGN PATENT DOCUMENTS

| | | |
|---|---|---|
| EP | 0155989 | 10/1985 |
| EP | 0272416 A2 | 6/1988 |
| EP | 0355614 | 2/1990 |
| EP | 0465924 A2 | 6/1991 |
| EP | 0687710 A2 | 12/1995 |
| EP | 0933395 A2 | 8/1999 |
| EP | 1624008 A1 | 2/2006 |
| WO | 0026275 A1 | 5/2000 |

OTHER PUBLICATIONS

European Patent Office, International Search Report, Date of Mailing: Jun. 25, 2008, International Application No. PCT/US2008/060202.
European Patent Office, International Search Report, Date of Mailing: Jul. 16, 2008, International Application No. PCT/ US2008/061227.
International Preliminary Report on Patentability and Written Opinion of the International Searching Authority for PCT/US2008/060202, mailed Nov. 12, 2009, 8 pages.

* cited by examiner

*Primary Examiner*—William K Cheung
(74) *Attorney, Agent, or Firm*—Cantor Colburn LLP; Diderico van Eyl

(57) ABSTRACT

A composition comprises a polyester-polycarbonate polymer comprising isophthalate-terephthalate-resorcinol ester units and carbonate units, a poly($C_4$-alkylene) ester, and a polyester comprising cyclohexanedimethylene terephthalate units, or a combination of cyclohexanedimethylene terephthalate and ethylene terephthalate. The composition can be extruded into pellets that are clear and colorless. The composition can further be molded into articles having a percent haze value less than or equal to 10 percent, and total luminous transmittance value of greater than or equal to 70 percent, measured in accordance with ASTM D1003-00. Also disclosed is a method for forming the compositions, and articles prepared therefrom.

64 Claims, No Drawings

POLYESTER POLYCARBONATE COMPOSITIONS, METHODS OF MAKING, AND ARTICLES FORMED THEREFROM

BACKGROUND OF THE INVENTION

This disclosure relates to polyester polycarbonate compositions, methods of making, and articles formed therefrom.

Polyesters can be blended with other miscible or immiscible polymers to improve various properties of the polyester. Specifically, polyesters can be blended with polycarbonates to provide improved mechanical properties such as impact strength, and/or can also be added to improve rheological properties such as melt volume rate. However, other properties of the polyester, specifically optical properties, can be adversely affected by forming a blend. Such polyester blends can have a hazy appearance, with diminished light transmittance. Miscible blends, that is, blends that have substantially a single phase, tend to have less haze. It has been difficult, however, to develop blends of polyesters and polycarbonates that have sufficient miscibility to provide good optical properties, while maintaining other advantageous properties of the blends.

There accordingly remains a need in the art for miscible polyester polycarbonate compositions comprising polycarbonate and polyester, in particular polyester polycarbonate compositions having high transparency and low haze. It would be a further advantage if the compositions had other advantageous properties, for example, weatherability, barrier, and chemical resistance.

SUMMARY OF THE INVENTION

The above deficiencies in the art are alleviated by a composition comprising from 5 to 85 weight percent of a polyester-polycarbonate polymer of the formula

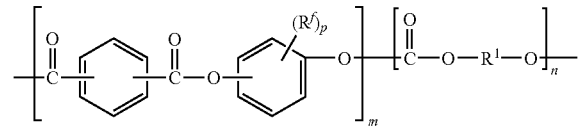

wherein each $R^f$ is independently a halogen atom, a $C_{1-12}$ hydrocarbon group, or a halogen-substituted $C_{1-12}$ hydrocarbon group, m and n are each greater than one, p is 0 to 4, and each $R^1$ is independently a $C_{6-30}$ aromatic hydrocarbon group, from 1 to 70 weight percent of a poly($C_4$-alkylene terephthalate) ester; and from 1 to 85 weight percent of a polyester comprising cyclohexyldimethylene terephthalate units, ethylene terephthalate units, or a combination of cyclohexyldimethylene terephthalate and ethylene terephthalate units; wherein weight percents are based on the total weight of the polyester-polycarbonate polymer, the poly($C_4$-alkylene terephthalate) ester, and the polyester.

In another embodiment, a composition comprises from 5 to 85 weight percent a polyester-polycarbonate polymer comprising isophthalate-terephthalate-resorcinol ester units and carbonate units of the formula

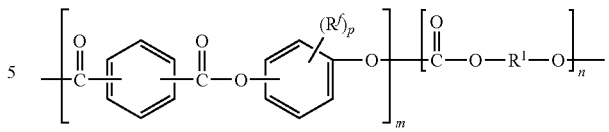

wherein each $R^f$ is independently a halogen atom, a $C_{1-12}$ hydrocarbon group, or a halogen-substituted $C_{1-12}$ hydrocarbon group, p is 0 to 4, m and n are each greater than one, each $R^1$ is independently a $C_{6-30}$ aromatic hydrocarbon group, m is 2 to 500, and n is 2 to 500; from 5 to 45 weight percent of a poly($C_4$-alkylene terephthalate) ester; and from 1 to 85 weight percent a polyester comprising cyclohexyldimethylene terephthalate units, ethylene terephthalate units, or a combination of cyclohexyldimethylene terephthalate and ethylene terephthalate units; wherein weight percents are based on the total weight of the polyester-polycarbonate polymer, the poly($C_4$-alkylene terephthalate) ester, and the polyester.

In another embodiment, a composition comprises from 5 to 65 weight percent poly(isophthalate-terephthalate-resorcinol ester)-co-(bisphenol-A carbonate); from 5 to 45 weight percent poly(1,4-butylene terephthalate); and from 15 to 85 weight percent poly(ethylene terephthalate)-co-poly(1,4-cyclohexyldimethylene terephthalate), wherein the poly(ethylene terephthalate)-co-poly(1,4-cyclohexyldimethylene terephthalate) comprises from 60 to 80 mole percent ethylene terephthalate units and from 20 to 40 mole percent 1,4-cyclohexyldimethylene terephthalate units; and wherein weight percents are based on the total weight of the polyester-polycarbonate polymer, the poly(1,4-butylene terephthalate), and the poly(ethylene terephthalate)-co-poly(1,4-cyclohexyldimethylene terephthalate); and further wherein an article molded from the composition has a percent haze value of less than or equal to 10 percent, and a total luminous transmittance value of greater than or equal to 70 percent, each measured according to ASTM D1003-00.

In another embodiment, a composition comprises from 5 to 85 weight percent poly(isophthalate-terephthalate-resorcinol ester)-co-(bisphenol-A carbonate); from 5 to 45 weight percent poly(1,4 butylene terephthalate); and from 5 to 85 weight percent poly(ethylene terephthalate)-co-poly(1,4-cyclohexyldimethylene terephthalate); wherein the poly(ethylene terephthalate)-co-poly(1,4-cyclohexyldimethylene terephthalate) comprises from 10 to 30 mole percent ethylene terephthalate units and from 70 to 90 mole percent 1,4-cyclohexyldimethylene terephthalate units; wherein weight percents are based on the total weight of the polyester-polycarbonate polymer, the poly(1,4-butylene terephthalate), and the poly(ethylene terephthalate)-co-poly(1,4-cyclohexyldimethylene terephthalate); and further wherein an article molded from the composition has a percent haze value of less than or equal to 10 percent, and a total luminous transmittance value of greater than or equal to 70 percent, each measured according to ASTM D1003-00.

In another embodiment, a composition comprises from 45 to 85 weight percent poly(isophthalate-terephthalate-resorcinol ester)-co-(bisphenol-A carbonate); from 1 to 35 weight percent poly(1,4-butylene terephthalate); and from 1 to 40 weight percent poly(1,4-cyclohexyldimethylene terephthalate); wherein weight percents are based on the total weight of the polyester-polycarbonate polymer, the poly(1,4-butylene terephthalate), and the poly(1,4-cyclohexyldimethylene terephthalate); and further wherein an article molded from the composition has a percent haze value of less than or equal to 10 percent, and a total luminous transmittance value of greater than or equal to 70 percent, each measured according to ASTM D1003-00.

In another embodiment, a method of forming a composition comprises melt blending the components of the any one of the above-described compositions.

In another embodiment, an article comprising any one of the above-described compositions is disclosed.

The above described and other features are exemplified by the following detailed description.

DETAILED DESCRIPTION OF THE INVENTION

Surprisingly, it has been found that a composition comprising, in specific ratios, a blend of a polyester-polycarbonate polymer having isophthalate terephthalate resorcinol (ITR) ester units and carbonate units, a poly($C_4$-alkylene terephthalate) ester, and a polyester comprising cyclohexyldimethylene terephthalate units, ethylene terephthalate units, or a combination of cyclohexyldimethylene terephthalate units and ethylene terephthalate units, has a low haze value and a high total luminous transmittance value. The blend of these polymers can be extruded to provide transparent pellets when the amount of the polyester-polycarbonate polymer is from 5 to 85 weight percent (wt %), the amount of the poly($C_4$-alkylene terephthalate) ester is from 1 to 70 wt %, and the amount of the polyester is from 1 to 85 wt %.

The singular forms "a," "an," and "the" include plural referents unless the context clearly dictates otherwise. The terms "first," "second," and the like herein do not denote any order, quantity, or importance, but rather are used to distinguish one element from another. Unless defined otherwise, technical and scientific terms used herein have the same meaning as is commonly understood by one of skill. Compounds are described using standard nomenclature.

Other than in the operating examples or where otherwise indicated, all numbers or expressions referring to quantities of ingredients, reaction conditions, and the like, used in the specification and claims are to be understood as modified in all instances by the term "about." The term "combination thereof" means that one or more of the listed components is present, optionally together with one or more like components not listed. Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All ASTM tests and data are from the 2003 edition of the Annual Book of ASTM Standards unless otherwise indicated.

The composition comprises a polyester-polycarbonate polymer, also known as a polyester carbonate, copolyester-polycarbonate, and copolyestercarbonate. The polyester-polycarbonate polymer comprises ITR ester units and carbonate units of the formula (1)

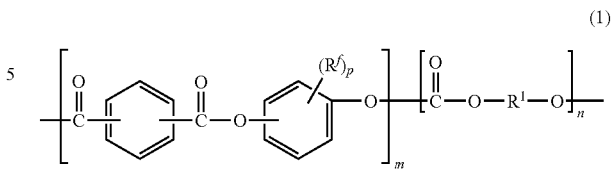

wherein each $R^f$ is independently a halogen atom, a $C_{1-12}$ hydrocarbon group, or a halogen-substituted $C_{1-12}$ hydrocarbon group, p is 0 to 4, each $R^1$ is independently a $C_{6-30}$ hydrocarbon group wherein at least 60% of the $R^1$ groups are aromatic, and m and n are each independently greater than one. In an embodiment, m is 2 to 500, and n is 2 to 500.

In a specific embodiment, $R^f$ in formula (1) s a $C_{1-3}$ alkyl group or a halogen-substituted $C_{1-3}$ alkyl group, and p as 0 to 2. In another embodiment, p is zero.

The ITR ester units can be derived from the reaction of a mixture of terephthalic acid and isophthalic acid or a chemical equivalent thereof with a compound such as resorcinol, 5-methyl resorcinol, 5-ethyl resorcinol, 5-propyl resorcinol, 5-butyl resorcinol, 5-t-butyl resorcinol, 2,4,5-trifluoro resorcinol, 2,4,6-trifluoro resorcinol, 4,5,6-trifluoro resorcinol, 2,4,5-tribromo resorcinol, 2,4,6-tribromo resorcinol, 4,5,6-tribromo resorcinol, or a combination comprising at least one of the foregoing compounds.

In another specific embodiment, $R^1$ in formula (1) is derived from a dihydroxy compound of formula (2)

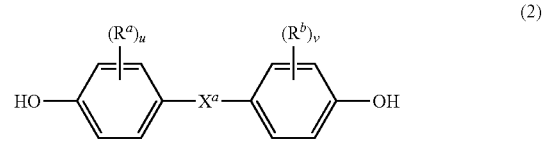

wherein each $R^a$ and $R^b$ is independently a halogen atom or a $C_{1-12}$ alkyl, and u and v are each independently integers of 0 to 4. Also in formula (2), $X^a$ represents a bridging group connecting the two hydroxy-substituted aromatic groups, wherein the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic group. The $C_{1-18}$ organic bridging group can be cyclic (including fused rings) or acyclic, aromatic (including fused rings) or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group.

In one embodiment, $R^a$ and $R^b$ are each independently a halogen or a $C_{1-3}$ alkyl group, and u and v are each independently 0 to 1. In this or other embodiments, $X^a$ is a $C_{1-18}$ alkylene group, a $C_{3-18}$ cycloalkylene group, a fused $C_{6-18}$ cycloalkylene group, a group of the formula —B$^1$—W—B$^2$— wherein B$^1$ and B$^2$ are the same or different $C_{1-6}$ alkylene group and W is a $C_{3-12}$ cycloalkylidene group or a $C_{6-16}$ arylene group, a $C_{3-18}$ cycloalkylidene, a $C_{1-25}$ alkylidene of formula —C(R$^c$)(R$^d$)— wherein R$^c$ and R$^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. The foregoing $X^a$ groups can be unsubstituted or substituted with one or more halogens, $C_{1-12}$ alkyl groups, $C_{6-18}$ aromatic groups, and/or heteroatom containing groups, such as ester, amide, and the like.

Some illustrative examples of specific aromatic dihydroxy compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3,5-trimethylcyclohexylidenebisphenol, 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

In a specific embodiment, $R^1$ is derived from 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl) propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used. In a specific embodiment, $R^1$ is derived from bisphenol A.

In one embodiment, the ratio of ITR ester units (m) to the carbonate units (n) in the polyester-polycarbonate is 5:99 to 95:1, specifically 5:95 to 95:5, more specifically 10:90 to 90:10, still more specifically 20:80 to 80:20. In this embodiment, m can be 2 to 500, and n can be 2 to 500.

In a specific embodiment of the polyester-polycarbonate polymer of formula (1), $R^f$ is a $C_{1-3}$ alkyl group or a halogen-substituted $C_{1-3}$ alkyl group, p is 0 to 2, $R^a$ and $R^b$ are each independently a halogen or a $C_{1-3}$ alkyl group, u and v are each independently 0 to 1, and $X^a$ is a $C_{1-25}$ alkylidene of formula —C($R^c$)($R^d$)— wherein $R^c$ and $R^d$ are each independently hydrogen, $C_{1-12}$ alkyl, or $C_{7-12}$ arylalkyl. In another embodiment, p is zero, u and v are each zero, and $X^a$ is a $C_{1-13}$ alkylidene of formula —C($R^c$)($R^d$)— wherein $R^c$ and $R^d$ are each independently hydrogen or $C_{1-6}$ alkyl, specifically methyl.

Chain stoppers (also referred to as capping agents), which limit molecular weight growth rate during manufacture of the polymer can be used. Suitable chain stoppers include monophenolic compounds such as phenol, p-cumyl-phenol, p-tertiary-butyl phenol, and hydroxy diphenyl, monoethers of hydroquinones such as p-methoxyphenol, alkyl-substituted phenols including those with branched chain alkyl substituents having 8 to 9 carbon atoms, mono-phenolic UV absorbers such as 4-substituted-2-hydroxybenzophenones, aryl salicylate, monoesters of diphenols such as resorcinol monobenzoate, 2-(2-hydroxyaryl)-benzotriazole, 2-(2-hydroxyaryl)-1,3,5-triazines, and the like; monocarboxylic acid chlorides such as benzoyl chloride, $C_{1-22}$ alkyl-substituted benzoyl chlorides (e.g., 4-methylbenzoyl chloride), halogen-substituted benzoyl chlorides (e.g., bromobenzoyl chloride), cinnamoyl chloride, 4-nadimidobenzoyl chloride, trimellitic anhydride chloride, and chlorides of aliphatic monocarboxylic acids with up to 22 carbon atoms; and monochloroformates such as phenyl chloroformate, $C_{1-22}$ alkyl-substituted phenyl chloroformate, p-cumyl phenyl chloroformate, toluene chloroformate, and the like. Specific monophenolic chain stoppers include phenol, p-cumylphenol, and resorcinol monobenzoate.

The polyester-polycarbonate polymers can have a weight-averaged molecular weight (Mw) of 1,500 to 100,000 atomic mass units, specifically 1,700 to 50,000 atomic mass units, and more specifically 2,000 to 40,000 atomic mass units. Molecular weight determinations are performed using gel permeation chromatography (GPC), using a crosslinked styrene-divinylbenzene column and calibrated to polystyrene references. Samples are prepared at a concentration of about 1 mg/ml, and are eluted at a flow rate of about 1.0 ml/min.

The poly(isophthalate-terephthalate-resorcinol ester)s can be obtained by interfacial polymerization or melt-process condensation, by solution phase condensation, or by transesterification polymerization. It is possible to use a branched poly(isophthalate-terephthalate-resorcinol ester)s in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the poly(isophthalate-terephthalate-resorcinol ester)s, depending on the ultimate end use of the composition.

The poly(isophthalate-terephthalate-resorcinol ester)s can then be reacted with a carbonate precursor in the presence of a suitable dihydroxy compound such as an aromatic diol of formula (2). Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. It is also desirable to include a chain stopper in addition to the dihydroxy compound.

In a specific embodiment, a poly(isophthalate-terephthalate-resorcinol ester) is prepared by solution phase condensation, i.e., is prepared by contacting a mixture of isophthalic acid and terephthalic acid with resorcinol in a suitable solvent. To the resulting mixture is then added BPA, phenol (chain stopper), and phosgene (carbonyl chloride, a carbonate precursor). Poly(isophthalate-terephthalate-resorcinol ester)-co-(bisphenol-A carbonate) is thus produced.

In addition to the polyester-polycarbonate polymer described above, the compositions also comprise two different polyesters, a poly($C_4$-alkylene terephthalate) ester and a polyester comprising cyclohexyldimethylene terephthalate units, ethylene terephthalate units, or a combination of cyclohexyldimethylene terephthalate and ethylene terephthalate units.

Examples of poly($C_4$-alkylene terephthalate) esters include poly(1,4-butylene terephthalate), poly(1,3-butylene terephthalate), poly(1,2-butylene terephthalate), poly(1,1-butylene terephthalate), poly(1,3-2-methylpropylene terephthalate), poly(1,2-2-methylpropylene terephthalate), and combinations comprising at least one of the foregoing poly($C_4$-alkylene terephthalate) esters. In a specific embodiment, the poly($C_4$-alkylene terephthalate) ester is poly(1,4-butylene terephthalate) (PBT).

The polyester comprising cyclohexyldimethylene terephthalate units, ethylene terephthalate units, or a combination of cyclohexyldimethylene terephthalate and ethylene terephthalate units can be selected from poly(cyclohexyldimethylene terephthalate) (PCT), poly(ethylene terephthalate)-co-(1,4-cyclohexyldimethylene terephthalate), abbreviated as PETG where the polymer comprises greater than 50 mol % of ethylene terephthalate ester units, and abbreviated as PCTG where the polymer comprises greater than 50 mol % of 1,4-cyclohexyldimethylene terephthalate ester units. In one embodiment, the poly(ethylene terephthalate)-co-(1,4-cyclohexyldimethylene terephthalate) comprises 10 to 90 mole percent ethylene terephthalate units and 10 to 90 mole percent 1,4-cyclohexyldimethylene terephthalate units. In one embodiment, the polyester is PCT. In another embodiment, the polyester is PET. In another embodiment, the polyester is PETG. In yet another embodiment, the polyester is PCTG. Where 1,4-cyclohexyldimethylene units are present, a mixture of cis-to trans-isomers in ratios of about 1:4 to about 4:1 can be used. Specifically, a ratio of cis-to trans-isomers of about 1:3 can be useful. Additionally, up to 30 mole percent of isophthalate units can be present along with terephthalate units in both PCTG and PETG, based on the total moles of terephthalate units.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate).

It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

The polyester-polycarbonate polymer is present in the composition in an amount of 5 to 85 weight percent. In one embodiment, the polyester-polycarbonate polymer is present in the composition in an amount of 5 to 65 weight percent. In another embodiment, the polyester-polycarbonate polymer is present in the composition in an amount of 45 to 85 weight percent.

The poly($C_4$-alkylene terephthalate) ester is present in the composition in an amount of 1 to 70 weight percent. In one embodiment, the poly($C_4$-alkylene terephthalate) ester is present in the composition in an amount of 5 to 45 weight percent. In another embodiment, the poly($C_4$-alkylene terephthalate) ester is present in the composition in an amount of 1 to 35 weight percent.

The polyester comprising cyclohexyldimethylene terephthalate units, ethylene terephthalate units, or a combination thereof is present in the composition in an amount of 1 to 85 weight percent. In one embodiment, this polyester is present in the composition in an amount of 5 to 85 weight percent. In another embodiment, this polyester is present in the composition in an amount of 15 to 85 weight percent. In yet another embodiment, this polyester is present in the composition in an amount of 1 to 40 weight percent. All of the foregoing weight percents are based on the total weight of the polyester-polycarbonate polymer, the poly($C_4$-alkylene terephthalate) ester, and the polyester.

In addition to the polyester-polycarbonate polymer, the poly($C_4$-alkylene terephthalate) ester, and the polyester, the composition can include various other additives ordinarily incorporated with compositions of this type, such as an antioxidant, a heat stabilizer, a light stabilizer, an ultraviolet light absorber, a plasticizer, a mold release agent, a lubricant, an antistatic agent, a quencher or a colorant such as a pigment or a dye. Mixtures comprising at least one of the foregoing additives can be used. Such additives can be mixed at a suitable time during the mixing of the components for forming the composition.

The composition can comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Blue 15:4, Pigment Blue 28, Pigment Green 7, Pigment Yellow 147 and Pigment Yellow 150, or combinations comprising at least one of the foregoing pigments. Pigments can be used in amounts of 0.01 to 10 percent by weight, based on the total weight of the polyester-polycarbonate polymer, the poly($C_4$-alkylene terephthalate) ester, and the polyester, where the use of the pigment does not significantly adversely affect the desired properties of the composition.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl-or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes can be used in amounts of 0.01 to 10 percent by weight, based on the total weight of the polyester-polycarbonate polymer, the poly($C_4$-alkylene terephthalate) ester, and the polyester, where the use of the dyes does not significantly adversely affect the desired properties of the composition.

The composition can further comprise an antioxidant. Suitable antioxidant additives include, for example, organophosphites such as tris(nonyl phenyl)phosphite, tris(2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.0001 to 1 percent by weight, based on the total weight of the polyester-polycarbonate polymer, the poly($C_4$-alkylene terephthalate) ester, and the polyester.

Suitable heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 percent by weight, based on the total weight of the polyester-polycarbonate polymer, the poly($C_4$-alkylene terephthalate) ester, and the polyester.

Light stabilizers and/or ultraviolet light (UV) absorbing additives can also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.0001 to 1 percent by weight, based on the total weight of the polyester-polycarbonate polymer, the poly($C_4$-alkylene terephthalate) ester, and the polyester.

Suitable ultraviolet light absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene) bis(4H-3, 1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing ultraviolet light absorbers. Ultraviolet light absorbers can be used in amounts of 0.0001 to 1 percent by weight, based on the total weight of the polyester-polycarbonate polymer, the poly($C_4$-alkylene terephthalate) ester, and the polyester.

Suitable quenchers include zinc phosphate, mono zinc phosphate, phosphorous acid or phosphoric acid (diluted in water), sodium acid pyrophosphate and other phosphorous based compounds. Quenchers are not restricted to just phosphorus-based compounds, they can also include silicon-based compounds (such as tetrapropyl orthosilicate or tetrakis-(2-methoxyethoxy) silane). Sometimes they could also include compounds such as sodium lauryl sulphate, boric acid, citric acid, oxalic acid and cyclic iminoether containing compounds. Quenchers can be used in an amount that is at least 0.0001 based on the total weight of the polyester-polycarbonate polymer, the poly($C_4$-alkylene terephthalate) ester, and the polyester. In one embodiment, the amount of the quencher can range from 0.0001 to 0.2 percent by weight, based on the total weight of the polyester-polycarbonate polymer, the poly($C_4$-alkylene terephthalate) ester, and the polyester.

Plasticizers, lubricants, and/or mold release agents additives can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di-or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 percent by weight, specifically 0.01 to 0.75 percent by weight, more specifically 0.1 to 0.5 percent by weight, based on the total weight of the polyester-polycarbonate polymer, the poly($C_4$-alkylene terephthalate) ester, and the polyester.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat® 6321 (Sanyo) or Pebax® MH1657 (Atofina), Irgastat® P18 and P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. Antistatic agents can be used in amounts of 0.0001 to 5 percent by weight, based on the total weight of the polyester-polycarbonate polymer, the poly($C_4$-alkylene terephthalate) ester, and the polyester.

In an embodiment, the foregoing additives are present in a total amount of less than or equal to 5 wt %, based on the total weight of the polyester-polycarbonate polymer, the poly($C_4$-alkylene terephthalate) ester, and the polyester.

The composition can also comprise other polymers. In one embodiment, the composition comprises from 0 to less than 10 wt % of a polymer such as a polycarbonate, a polyetherimide, and combinations thereof. In another embodiment, the composition comprises from zero to less than 5 wt % of a polymer selected from the group consisting of polycarbonates, polyetherimides and combinations thereof. Such amounts are particularly useful for making clear and colorless compositions.

The composition can be manufactured by methods generally available in the art, for example, in one embodiment, powdered polyester-polycarbonate polymer, poly($C_4$-alkylene terephthalate) ester, and polyester, and other optional components including stabilizer packages (e.g., antioxidants, gamma stabilizers, heat stabilizers, ultraviolet light stabilizers, and the like) and/or other additives are first blended, for example in a HENSCHEL-Mixer® high speed mixer. Other low shear processes including but not limited to hand mixing can also accomplish this blending. The blend is then fed into the throat of an extruder via a hopper. Alternatively, one or more of the components can be incorporated into the composition by feeding directly into the extruder at the throat and/or downstream through a sidestuffer. Where desired, the polyester-polycarbonate polymer, poly($C_4$-alkylene terephthalate) ester, the polyester, and any desired polymer and/or additives can also be compounded into a masterbatch and combined with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In a specific embodiment, a method of preparing the composition comprises melt blending a polyester-polycarbonate polymer, a poly($C_4$-alkylene terephthalate) ester, and an polyester. The melt blending can be done by extrusion.

In another specific embodiment, the composition is extruded using a 28 mm twin-screw extruder with a vacuum vented mixing screw. The extruder is typically operated at a temperature of 200 to 300° C., specifically 220 to 285° C., more specifically 240 to 270° C., wherein the die temperature can be different. The extruded composition is quenched in water and pelletized.

The extruded pellets formed from the composition have excellent optical properties. Thus in one embodiment, the extruded pellets comprising the composition are clear. In another embodiment, the extruded pellets comprising the composition are colorless. In yet another embodiment, the extruded pellets comprising the composition are clear and colorless.

As such, one embodiment is a composition comprising from 5 to 85 weight percent of a polyester-polycarbonate polymer of the formula (1) wherein each $R^f$ is independently a halogen atom, a $C_{1-12}$ hydrocarbon group, or a halogen-substituted $C_{1-12}$ hydrocarbon group, p is 0 to 4, and each $R^1$ is independently a $C_{6-30}$ aromatic hydrocarbon group, from 1 to 70 weight percent of a poly($C_4$-alkylene terephthalate) ester; and from 1 to 85 weight percent of a polyester comprising cyclohexyldimethylene terephthalate units, ethylene terephthalate units, or a combination of cyclohexyldimethylene terephthalate and ethylene terephthalate units; wherein all weight percents are based on the total weight of the polyester-polycarbonate polymer, the poly($C_4$-alkylene terephthalate) ester, and the polyester; wherein an extruded pellet comprising the composition is clear.

Another embodiment is a composition comprising from 5 to 85 weight percent of a polyester-polycarbonate polymer of the formula (1) wherein each $R^f$ is independently a halogen atom, a $C_{1-12}$ hydrocarbon group, or a halogen-substituted $C_{1-12}$ hydrocarbon group, p is 0 to 4, and each $R^1$ is independently a $C_{6-30}$ aromatic hydrocarbon group, from 1 to 70 weight percent of a poly($C_4$-alkylene terephthalate) ester; and from 1 to 85 weight percent of a polyester comprising cyclohexyldimethylene terephthalate units, ethylene terephthalate units, or a combination of cyclohexyldimethylene terephthalate and ethylene terephthalate units; wherein all weight percents are based on the total weight of the polyester-polycarbonate polymer, the poly($C_4$-alkylene terephthalate) ester, and the polyester; wherein an extruded pellet comprising the composition is clear and colorless.

Articles can then be shaped, extruded, or molded from the composition. In particular, various known molding methods can be used, for example, injection molding, gas assist injection molding, vacuum molding, compression molding, rotary molding, and the like. Injection molding can be advantageous. Examples of articles comprising the composition include lens covers, sheets, protective sheets, films, fibers, housewares, medical applications, automotive, garden equipment, sports and leisure articles, and the like.

Articles molded from the composition exhibit advantageous optical properties. Percent haze and total luminous transmittance, determined in accordance with ASTM D1003-00, are used to describe the optical properties of the articles molded from the composition. An article molded from the composition has a percent haze value of less than or equal to 10 percent. Another article molded from the composition has a total luminous transmittance value of greater than or equal to 70 percent. Another article molded from the composition has a percent haze value of less than or equal to 10 percent and a total luminous transmittance value of greater than or equal to 70 percent.

The compositions are further illustrated by the following non-limiting examples.

EXAMPLES

The compositions were compounded on a Werner and Pfleider 28 millimeter twin screw extruder with a vacuum vented mixing screw, barrel and die head temperatures between 240° C. and 265° C., and 150 to 300 rpm screw speed. The extruder has eight (8) independent feeders and could be operated at a maximum rate of 30 kilograms per hour. The extrudate was cooled through a water bath prior to pelletizing. Test parts were injection molded on a van Dorn molding machine with a temperature of 240° C. to 265° C. The pellets were dried for 3 to 4 hours at 60° C.-120° C. in a forced air circulating oven prior to injection molding.

Polymer molecular weights were determined by gel permeation chromatography (GPC) using a crosslinked styrene-divinylbenzene gel column, a sample concentration of 1 milligram per milliliter, and was calibrated using polycarbonate standards. Percent haze (Haze), total luminous transmittance (% T), and yellowing index (YI) were measured on 2.5 millimeter plaques according to ASTM D1003-00 using a Haze-Guard Dual, obtained from BYK-Gardner.

Compositions for the examples and comparative examples were prepared using the components shown in Table 1.

Each of the ITR-PC polymers used herein was prepared according to the following general procedure. A 30 liter round bottom reactor equipped with a mechanical stirrer, pH electrode, condenser, and two addition tubes connected to metering pumps was charged with resorcinol (12.5 to 25 mole percent (mol %) excess relative to the total moles of diacid chloride), water (to provide 34 to 35 wt % salts following preparation of the hydroxy-terminated polyester), methylene chloride (6 liters), and triethylamine (2 mol %). The mixture was stirred with a 6-inch impeller at 300 to 350 rpm. One addition tube was connected to a solution consisting of a 50:50 mixture of isophthaloyl and terephthaloyl chloride and enough methylene chloride to make an approximately 35 wt % diacid chloride solution. The other addition tube was connected to a 50 wt % aqueous sodium hydroxide solution. Over the course of 10 minutes, the diacid chloride solution containing 3.42 moles isophthaloyl dichloride and 3.42 moles terephthaloyl dichloride, and 85 to 95 mol % of the NaOH solution (based on diacid chloride) were added at constant molar flow rates to the reactor. Upon completion of the acid chloride addition, a further amount of NaOH solution was added to the reactor over 3 minutes in order to adjust the pH to approximately 8.25, and the mixture was allowed to stir for roughly 10 minutes. After formation of the resulting hydroxy-terminated polyesters was complete, phenol (3.4 mol % based on total bisphenol-A), bisphenol-A (BPA), water, and methylene chloride were added to the mixture. The amount of BPA added was based upon the formula:

$$\text{Moles } BPA \text{ added} = 6.84 \text{ moles diacid chloride} \times ((\text{mol } \% PC)/(\text{mol } \% ITR))$$

wherein, for example, a polymer with a desired composition of 20 mol % carbonate units and 80 mol % ester units (i.e., 80:20 ITR-PC), uses an amount of BPA=6.84×20/80=1.71 moles BPA.

Prior to phosgenation, sufficient additional water was added to dissolve all of the sodium chloride present in the reaction mixture at the end of formation of the hydroxy-terminated polyester intermediate. Additional methylene

TABLE 1

| Component | Description | Source |
|---|---|---|
| PC | Polycarbonate resin (Mw = 60,000 g/mol, PS standards) | GE Plastics |
| 20:80 ITR-PC | Poly(20 wt. % isophthalate-terephthalate-resorcinol ester)-co-(80 wt. % bisphenol-A carbonate) copolymer (Mw = 60,000 g/mol, PS standards) | GE Plastics |
| 90:10 ITR-PC | Poly(90 wt. % isophthalate-terephthalate-resorcinol)-co-(10 wt. % bisphenol-A carbonate) copolymer (Mw = 40,000 g/mol, PS standards) | GE Plastics |
| PBT | Poly(butylene terephthalate) (Mw = 105,000 g/mol, PS standard) | GE Plastics |
| PETG | Poly(70 mol % ethylene terephthalate)-co-(30 mol % 1,4-cyclohexanedimethylene terephthalate) (Mw = 70,000 g/mol, PS standards) | Eastman Chemical |
| PCTG | Poly(20 mol % ethylene terephthalate)-co-(80 mol % 1,4-cyclohexanedimethylene terephthalate) (Mw = 70,000 g/mol, PS standards) | Eastman Chemical |
| PCT | Poly(1,4-cyclohexanedimethylene terephthalate) (Mw = 70,000 g/mol, PS standards) | Eastman Chemical | chloride was introduced to provide a concentration of solids in the organic phase at the end of phosgenation of 11 to 17 wt %.

The mixture comprising the hydroxy-terminated polyester, free phenol, free excess resorcinol, BPA, methylene chloride, sodium chloride, and triethylamine (TEA) was then phosgenated in the same reactor used to prepare the hydroxy-terminated polyester intermediate. 1.4 equivalents (based on the total moles of free BPA) of phosgene and 50 wt % sodium hydroxide solution (50 wt % NaOH) were then introduced at a constant rate over a period of 55 minutes while maintaining a pH of 8.5 until 60 mol % of the stoichiometric amount of phosgene had been added (60 mol % BPA conversion). The pH was adjusted to 9.5 and the remaining phosgene was added. Upon completion of phosgene addition, the reaction mixture was stirred for several minutes. The methylene chloride solution containing the product polyester-polycarbonate polymer was separated from the brine layer and washed twice with 1 N HCl, and four times with deionized water. The volumes of the aqueous washes were roughly equal to the volume of the product polymer solution. The product was isolated by injection of steam into a well-agitated mixture of hot water and the methylene chloride solution of the product polyester-polycarbonate. The product was isolated as a white powder, filtered, and dried for 24 hours at 80° C. to 100° C. The product polyester-polycarbonate was characterized by GPC (Mw, polystyrene molecular weight standards). The analytical results were consistent with the formation of block polyester-polycarbonates. NMR indicated that the product polyester-polycarbonate was fully end capped as shown by the absence of free terminal hydroxy groups and acid end-groups.

Examples 1-82, represented as En wherein n corresponds to the number of the experiment, and comparative examples 1-9, represented as Cn wherein n corresponds to the number of the experiment, were prepared by melt blending 20:80 ITR-PC or 90:10 ITR-PC with PBT and PETG, PCTG, or PCT according to the method described above. The weight ratios used in the examples and comparative examples are as described in Tables 2-4. All component amounts are in weight percent, based on the total weight of the composition. The appearance column refers to the post-extrusion appearance of pellets extruded from each composition before molding. The appearance is reported as clear, hazy, or opaque. Clear refers to compositions that are clear and colorless, or clear and colored, that allow clear images to pass through them undistorted. Hazy refers to compositions that allow light to pass through them, however images are blurred and/or distorted, or only partial images pass through them. Opaque compositions block all light from passing through them. Percent haze and total luminous transmittance are reported for molded articles of the compositions as described above.

TABLE 2

| | PBT | PETG | 20:80 ITR-PC | 90:10 ITR-PC | Post-extrusion Appearance | % T | Haze |
|---|---|---|---|---|---|---|---|
| C1 | 50 | 50 | — | — | Clear | 41.8 | 99.3 |
| C2 | 85 | 15 | — | — | Opaque | 17.1 | 99.3 |
| C3 | 15 | 85 | — | — | Clear | 87.1 | 1.3 |
| E1 | 10 | 80 | 10 | — | Clear | 86.5 | 1.6 |
| E2 | 10 | 80 | — | 10 | Clear | 87.6 | 1.1 |
| E3 | 45 | 45 | 10 | — | Clear | 59.9 | 91.1 |
| E4 | 45 | 45 | — | 10 | Clear | 68.6 | 71.9 |
| E5 | 40 | 40 | 20 | — | Clear | 85.6 | 5.0 |
| E6 | 40 | 40 | — | 20 | Clear | 85.7 | 3.4 |
| E7 | 70 | 10 | 20 | — | Hazy | 24.0 | 99.3 |
| E8 | 70 | 10 | — | 20 | Hazy | 22.3 | 99.3 |
| E9 | 10 | 70 | 20 | — | Clear | 87.6 | 1.7 |
| E10 | 10 | 70 | — | 20 | Clear | 87.6 | 1.2 |
| E11 | 35 | 35 | 30 | — | Clear | 87.2 | 2.1 |
| E12 | 35 | 35 | — | 30 | Clear | 86.8 | 1.6 |
| E13 | 60 | 10 | 30 | — | Clear | 45.0 | 99.3 |
| E14 | 60 | 10 | — | 30 | Clear | 41.8 | 99.3 |
| E15 | 10 | 60 | 30 | — | Clear | 87.0 | 1.6 |
| E16 | 10 | 60 | — | 30 | Clear | 87.8 | 1.3 |
| E17 | 30 | 30 | 40 | — | Clear | 86.9 | 1.7 |
| E18 | 30 | 30 | — | 40 | Clear | 87.5 | 1.4 |
| E19 | 25 | 25 | 50 | — | Clear | 87.3 | 1.8 |
| E20 | 25 | 25 | — | 50 | Clear | 87.5 | 1.6 |
| E21 | 20 | 20 | 60 | — | Clear | 87.7 | 1.9 |
| E22 | 20 | 20 | — | 60 | Clear | 87.2 | 1.9 |

TABLE 3

| | PBT | PCTG | 20:80 ITR-PC | 90:10 ITR-PC | Post-Extrusion Appearance | % T | Haze |
|---|---|---|---|---|---|---|---|
| C4 | 50 | 50 | — | — | Opaque | 15.6 | 99.3 |
| C5 | 85 | 15 | — | — | Opaque | 10.8 | 99.3 |
| C6 | 15 | 85 | — | — | Clear | 87.1 | 1.2 |
| E23 | 10 | 80 | 10 | — | Clear | 86.2 | 2.4 |
| E24 | 10 | 80 | — | 10 | Clear | 86.4 | 1.0 |
| E25 | 45 | 45 | 10 | — | Hazy | 44.4 | 92.2 |
| E26 | 45 | 45 | — | 10 | Hazy | 73.7 | 39.2 |
| E27 | 40 | 40 | 20 | — | Clear | 84.8 | 4.9 |
| E28 | 40 | 40 | — | 20 | Clear | 86.4 | 2.0 |
| E29 | 70 | 10 | 20 | — | Hazy | 18.9 | 99.4 |
| E30 | 70 | 10 | — | 20 | Hazy | 20.7 | 99.3 |
| E31 | 10 | 70 | 20 | — | Clear | 87.2 | 1.2 |
| E32 | 10 | 70 | — | 20 | Clear | 86.7 | 0.8 |
| E33 | 35 | 35 | 30 | — | Clear | 86.8 | 2.2 |
| E34 | 35 | 35 | — | 30 | Clear | 87.1 | 1.0 |
| E35 | 60 | 10 | 30 | — | Clear | 35.5 | 99.3 |
| E36 | 60 | 10 | — | 30 | Clear | 58.0 | 93.6 |
| E37 | 10 | 60 | 30 | — | Clear | 87.3 | 1.4 |
| E38 | 10 | 60 | — | 30 | Clear | 86.9 | 0.9 |
| E39 | 30 | 30 | 40 | — | Clear | 87.3 | 1.6 |
| E40 | 25 | 25 | 50 | — | Clear | 87.4 | 1.7 |
| E41 | 20 | 20 | 60 | — | Clear | 87.4 | 1.9 |
| E42 | 10 | 10 | — | 80 | Clear | 86.5 | 1.6 |

TABLE 4

| | PBT | PCT | 20:80 ITR-PC | 90:10 ITR-PC | Post-Extrusion Appearance | % T | Haze |
|---|---|---|---|---|---|---|---|
| C7 | 50 | 50 | — | — | Opaque | — | 99 |
| C8 | 85 | 15 | — | — | Opaque | — | 99 |
| C9 | 15 | 85 | — | — | Opaque | — | 99 |
| E43 | 10 | 80 | 10 | — | Hazy | 18.5 | 99.3 |
| E44 | 10 | 80 | — | 10 | Hazy | 19.4 | 99.3 |
| E45 | 45 | 45 | 10 | — | Hazy | 10.8 | 99.4 |
| E46 | 70 | 10 | 20 | — | Hazy | 13.5 | 99.3 |
| E47 | 70 | 10 | — | 20 | Hazy | 15.9 | 99.3 |
| E48 | 40 | 40 | 20 | — | Hazy | 11.9 | 99.3 |
| E49 | 40 | 40 | — | 20 | Hazy | 17.2 | 99.3 |
| E50 | 10 | 70 | 20 | — | Clear | 26.1 | 99.3 |
| E51 | 10 | 70 | — | 20 | Hazy | 25.4 | 99.5 |
| E52 | 55 | 15 | 30 | — | Hazy | 16.2 | 99.3 |
| E53 | 60 | 10 | — | 30 | Hazy | 34.9 | 99.3 |
| E54 | 35 | 35 | 30 | — | Clear | 19.5 | 99.4 |
| E55 | 35 | 35 | — | 30 | Hazy | 25.9 | 99.3 |
| E56 | 15 | 55 | 30 | — | Clear | 28.8 | 99.2 |
| E57 | 10 | 60 | — | 30 | Clear | 47.9 | 84.7 |

TABLE 4-continued

|  | PBT | PCT | 20:80 ITR-PC | 90:10 ITR-PC | Post-Extrusion Appearance | % T | Haze |
|---|---|---|---|---|---|---|---|
| E58 | 10 | 50 | 40 | — | Clear | 42.6 | 90.5 |
| E59 | 10 | 50 | — | 40 | Clear | 67.7 | 25.8 |
| E60 | 30 | 30 | 40 | — | Clear | 24.8 | 99.3 |
| E61 | 30 | 30 | — | 40 | Clear | 47.3 | 45.2 |
| E62 | 50 | 10 | — | 40 | Clear | 79.9 | 17.6 |
| E63 | 20 | 40 | — | 40 | Clear | 49.9 | 48.5 |
| E64 | 40 | 20 | — | 40 | Clear | 58.6 | 43.9 |
| E65 | 25 | 25 | — | 50 | Clear | 81.5 | 2.8 |
| E66 | 35 | 5 | 60 | — | Clear | 87.5 | 2.2 |
| E67 | 25 | 15 | 60 | — | Clear | 87.2 | 2.1 |
| E68 | 15 | 25 | 60 | — | Clear | 83.5 | 4.1 |
| E69 | 5.15 | 34.85 | 60 | — | Clear | 80.7 | 6.6 |
| E70 | 20 | 20 | — | 60 | Clear | 87.5 | 0.9 |
| E71 | 10 | 30 | — | 60 | Clear | 86.1 | 1.5 |
| E72 | 30 | 10 | — | 60 | Clear | 87.4 | 1.1 |
| E73 | 25 | 5 | 70 | — | Clear | 87.4 | 2.4 |
| E74 | 15 | 15 | 70 | — | Clear | 87.4 | 3 |
| E75 | 5.15 | 24.85 | 70 | — | Clear | 86.8 | 7.6 |
| E76 | 12.5 | 12.5 | 75 | — | Clear | 88.4 | 1.3 |
| E77 | 10 | 10 | — | 80 | Clear | 87 | 1.5 |
| E78 | 10 | 40 | — | 50 | Clear | 51.2 | 58.1 |
| E79 | 40 | 10 | — | 50 | Clear | 56.4 | 55.1 |
| E80 | 40 | 10 | 50 | — | Clear | 51.6 | 66.6 |
| E81 | 10 | 40 | 50 | — | Clear | 50.6 | 92.9 |
| E82 | 25 | 25 | 50 | — | Clear | 51.8 | 78.7 |

It can be seen from the data in Tables 2-4 that the extruded pellets of a substantial number of examples comprising three polymers, having a PBT content of 1 to 70 weight percent, an ITR-PC content of 5 to 85 weight percent, and a content of PETG, PCTG, or PCT of 1 to 85 weight percent, are clear. However, articles molded from the same compositions do not all exhibit a total luminous transmittance value higher than 70 percent, and a haze value lower than 10 percent.

Examples 1-2, 5-6, 9-12, and 15-22 in Table 2 show that molded articles of ternary compositions comprising 5 to 60 weight percent ITR-PC, 5 to 40 weight percent PBT, and 15 to 85 weight percent PETG have a total luminous transmittance value higher than 70 percent, and a haze value lower than 10 percent.

Examples 23-24, 27-28, 31-34, and 37-42 in Table 3 show that molded articles of ternary compositions comprising 5 to 85 weight percent ITR-PC, 5 to 45 weight percent PBT, and 5 to 85 weight percent PCTG have a total luminous transmittance value higher than 70 percent, and a haze value lower than 10 percent.

Examples 65-77 in Table 4 show that molded articles of certain ternary compositions comprising 45 to 85 weight percent ITR-PC, 1 to 35 weight percent PBT, and 1 to 40 weight percent PCT have a total luminous transmittance value higher than 70 percent, and a haze value lower than 10 percent.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition comprising
   from 5 to 85 weight percent of a polyester-polycarbonate polymer of the formula

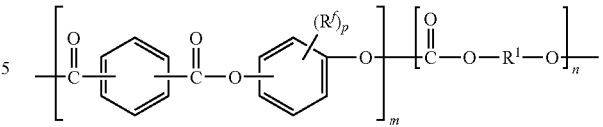

wherein each $R^f$ is independently a halogen atom, a $C_{1-12}$ hydrocarbon group, or a halogen-substituted $C_{1-12}$ hydrocarbon group, p is 0 to 4, m and n are each greater than one, and each $R^1$ is independently a $C_{6-30}$ aromatic hydrocarbon group;

from 1 to 70 weight percent of a poly($C_4$-alkylene terephthalate) ester; and from 1 to 85 weight percent of a polyester comprising cyclohexyldimethylene terephthalate units, ethylene terephthalate units, or a combination of cyclohexyldimethylene terephthalate and ethylene terephthalate units;

wherein weight percents are based on the total weight of the polyester-polycarbonate polymer, the poly($C_4$-alkylene terephthalate) ester, and the polyester, and wherein a molded article comprising the composition has a percent haze value of less than or equal to 10 percent, measured in accordance with ASTM D1003-00.

2. The composition of claim 1, wherein an extruded pellet derived from the composition is clear.

3. The composition of claim 2, wherein an extruded pellet derived from the composition is colorless.

4. The composition of claim 1, further comprising a quencher.

5. The composition of claim 4, wherein the quencher is zinc phosphate, mono zinc phosphate, phosphorous acid, phosphoric acid diluted in water, sodium acid pyrophosphate, tetrapropyl orthosilicate, tetrakis-(2-methoxyethoxy) silane, sodium lauryl sulphate, boric acid, citric acid, oxalic acid, a cyclic iminoether containing compound, or a combination comprising at least two of the foregoing quenchers.

6. A composition comprising
   from 5 to 85 weight percent a polyester-polycarbonate polymer comprising isophthalate-terephthalate-resorcinol ester units and carbonate units of the formula

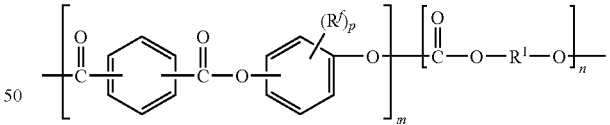

wherein each $R^f$ is independently a halogen atom, a $C_{1-12}$ hydrocarbon group, or a halogen-substituted $C_{1-12}$ hydrocarbon group, p is 0 to 4, m and n are each greater than one, each $R^1$ is independently a $C_{6-30}$ aromatic hydrocarbon group, m is 2 to 500, and n is 2 to 500;

from 5 to 45 weight percent of a poly($C_4$-alkylene terephthalate) ester; and from 1 to 85 weight percent a polyester comprising cyclohexyldimethylene terephthalate units, ethylene terephthalate units, or a combination of cyclohexyldimethylene terephthalate and ethylene terephthalate units;

wherein weight percents are based on the total weight of the polyester-polycarbonate polymer, the poly($C_4$-alkylene terephthalate) ester, and the polyester, and wherein a molded article comprising the composition has a percent haze value of less than or equal to 10 percent, measured in accordance with ASTM D1003-00.

7. The composition of claim 6, wherein a molded article comprising the composition has a total luminous transmittance value of greater than or equal to 70 percent, measured according to ASTM D1003-00.

8. The composition of claim 1, wherein each $R^f$ is independently a $C_{1-3}$ alkyl group or a halogen-substituted $C_{1-3}$ alkyl group, and p is 0 to 2.

9. The composition of claim 1, wherein $R^1$ is derived from a bisphenol of the formula

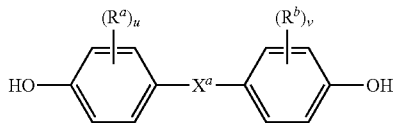

wherein $R^a$ and $R^b$ are each independently a halogen or a $C_{1-12}$ alkyl, $X^a$ is a $C_{1-18}$ alkylene, a $C_{1-18}$ alkylidene, a $C_{3-18}$ cycloalkylidene, or a $C_{9-18}$ fused cycloalkylidene-aromatic group, and u and v are each independently 0 to 4.

10. The composition of claim 9, wherein $R^a$ and $R^b$ are each independently a halogen or a $C_{1-3}$ alkyl, $X^a$ is a $C_{1-18}$ alkylidene or a $C_{3-18}$ cycloalkylidene, and u and v are each independently 0 to 1.

11. The composition of claim 1, wherein the polyester-polycarbonate polymer is poly(isophthalate-terephthalate-resorcinol ester)-co-(bisphenol-A carbonate).

12. The composition of claim 1, wherein the ratio of m to n in the polyester-polycarbonate polymer is 5:99 to 95:1.

13. The composition of claim 1, wherein m is 2 to 500, and n is 2 to 500.

14. The composition of claim 1, wherein the polyester-polycarbonate polymer further comprises additional ester units different from the isophthalate-terephthalate-resorcinol ester units.

15. The composition of claim 14, wherein the different ester units comprise isophthalate-terephthalate esters of dihydroxy compounds of the formula

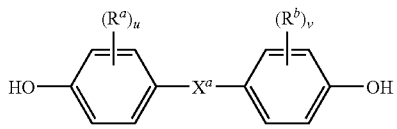

wherein $R^a$ and $R^b$ are each independently a halogen or a $C_{1-12}$ alkyl, $X^a$ is a $C_{1-18}$ alkylene, a $C_{1-18}$ alkylidene, a $C_{3-18}$ cycloalkylidene, or a $C_{9-18}$ fused cycloalkylidene-aromatic group, and u and v are each independently 0 to 4.

16. The composition of claim 1, wherein the poly($C_4$-alkylene terephthalate) ester is poly(1,4-butylene terephthalate).

17. The composition of claim 1, wherein the polyester is poly(ethylene terephthalate).

18. The composition of claim 1, wherein the polyester is poly(1,4-cyclohexyldimethylene terephthalate).

19. The composition of claim 1, wherein the polyester is poly(ethylene terephthalate)-co-(1,4-cyclohexyldimethylene terephthalate).

20. The composition of claim 1, wherein the poly(ethylene terephthalate)-co-(1,4-cyclohexyldimethylene terephthalate) comprises 10 to 90 mole percent ethylene terephthalate units and 10 to 90 mole percent 1,4-cyclohexyldimethylene terephthalate units, and further wherein the terephthalate units can comprise up to 30 mole percent isophthalate units, based on the total moles of isophthalate and terephthalate units.

21. The composition of claim 1, wherein the composition further comprises an additive selected from the group consisting of an antioxidant, heat stabilizer, light stabilizer, ultraviolet light absorber, plasticizer, mold release agent, lubricant, antistatic agent, pigment, dye, gamma stabilizer, and a combination thereof.

22. The composition of claim 6, wherein each $R^f$ is independently a $C_{1-3}$ alkyl group or a halogen-substituted $C_{1-3}$ alkyl group, and u is 0 to 2.

23. The composition of claim 6, wherein $R^1$ is derived from a bisphenol of the formula

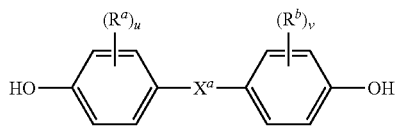

wherein $R^a$ and $R^b$ are each independently a halogen or a $C_{1-12}$ alkyl, $X^a$ is a $C_{1-18}$ alkylene, a $C_{1-18}$ alkylidene, a $C_{3-18}$ cycloalkylidene, or a $C_{9-18}$ fused cycloalkylidene-aromatic group, and u and v are each independently 0 to 4.

24. The composition of claim 23, wherein $R^a$ and $R^b$ are each independently a halogen or a $C_{1-3}$ alkyl, $X^a$ is a $C_{1-18}$ alkylidene or a $C_{3-18}$ cycloalkylidene, and u and v are each independently 0 to 1.

25. The composition of claim 6, wherein the polyester-polycarbonate polymer is poly(isophthalate-terephthalate-resorcinol ester)-co-(bisphenol-A carbonate).

26. The composition of claim 6, wherein the ratio of m to n in the polyester-polycarbonate polymer is 5:99 to 95:1.

27. The composition of claim 6, wherein m is 2 to 500, and n is 2 to 500.

28. The composition of claim 6, wherein the polyester-polycarbonate polymer further comprises additional ester units different from the isophthalate-terephthalate-resorcinol ester units.

29. The composition of claim 28, wherein the different ester units comprise isophthalate-terephthalate esters of dihydroxy compounds of the formula

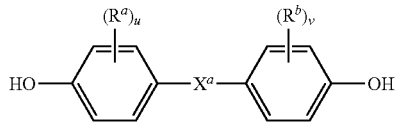

wherein $R^a$ and $R^b$ are each independently a halogen or a $C_{1-12}$ alkyl, $X^a$ is a $C_{1-18}$ alkylene, a $C_{1-18}$ alkylidene, a $C_{3-18}$ cycloalkylidene, or a $C_{9-18}$ fused cycloalkylidene-aromatic group, and u and v are each independently 0 to 4.

30. The composition of claim 6, wherein the poly($C_4$-alkylene terephthalate) ester is poly(1,4-butylene terephthalate).

31. The composition of claim 6, wherein the polyester is poly(ethylene terephthalate).

32. The composition of claim 6, wherein the polyester is poly(1,4-cyclohexyldimethylene terephthalate).

33. The composition of claim 6, wherein the polyester is poly(ethylene terephthalate)-co-(1,4-cyclohexyldimethylene terephthalate).

34. The composition of claim 6, wherein the poly(ethylene terephthalate)-co-(1,4-cyclohexyldimethylene terephthalate) comprises 20 to 80 mole percent ethylene terephthalate units and 20 to 80 mole percent 1,4-cyclohexyldimethylene terephthalate units.

35. The composition of claim 6, wherein the composition further comprises an additive selected from the group consisting of antioxidant, heat stabilizer, light stabilizer, ultraviolet light absorber, plasticizer, mold release agent, lubricant, antistatic agent, pigment, dye, gamma stabilizer, and a combination thereof.

36. The composition of claim 1, wherein the composition further comprises from zero to less than 10 weight percent of a polymer selected from the group consisting of a polycarbonate, a polyetherimide, and a combination thereof.

37. The composition of claim 1, wherein the composition further comprises from zero to less than 5 weight percent of a polymer selected from the group consisting of a polycarbonate, a polyetherimide, and a combination thereof.

38. A composition comprising
from 5 to 65 weight percent poly(isophthalate-terephthalate-resorcinol ester)-co-(bisphenol-A carbonate);
from 5 to 40 weight percent poly(1,4-butylene terephthalate); and
from 15 to 85 weight percent poly(ethylene terephthalate)-co-poly(1,4-cyclohexyldimethylene terephthalate), wherein the poly(ethylene terephthalate)-co-poly(1,4-cyclohexyldimethylene terephthalate) comprises from 60 to 80 mole percent ethylene terephthalate units and from 20 to 40 mole percent 1,4-cyclohexyldimethylene terephthalate units; and
wherein weight percents are based on the total weight of the polyester-polycarbonate polymer, the poly(1,4-butylene terephthalate), and the poly(ethylene terephthalate)-co-poly(1,4-cyclohexyldimethylene terephthalate); and further wherein
an article molded from the composition has a percent haze value of less than or equal to 10 percent, and a total luminous transmittance value of greater than or equal to 70 percent, each measured according to ASTM D1003-00.

39. The composition of claim 38, wherein the composition further comprises from zero to less than 10 weight percent of a polymer selected from the group consisting of a polycarbonate, a polyetherimide, and a combination thereof.

40. The composition of claim 38, wherein the composition further comprises from zero to less than 5 weight percent of a polymer selected from the group consisting of a polycarbonate, a polyetherimide, and a combination thereof.

41. The composition of claim 38, further comprising a quencher, wherein the quencher is selected from the group consisting of zinc phosphate, mono zinc phosphate, phosphorous acid, phosphoric acid diluted in water, sodium acid pyrophosphate, tetrapropyl orthosilicate, tetrakis-(2-methoxyethoxy) silane), sodium lauryl sulphate, boric acid, citric acid, oxalic acid, a cyclic iminoether containing compound, and a combination thereof.

42. A composition comprising
from 5 to 85 weight percent poly(isophthalate-terephthalate-resorcinol ester)-co-(bisphenol-A carbonate);
from 5 to 40 weight percent poly(1,4 butylene terephthalate); and
from 5 to 85 weight percent poly(ethylene terephthalate)-co-poly(1,4-cyclohexyldimethylene terephthalate);
wherein the poly(ethylene terephthalate)-co-poly(1,4-cyclohexyldimethylene terephthalate) comprises from 10 to 30 mole percent ethylene terephthalate units and from 70 to 90 mole percent 1,4-cyclohexyldimethylene terephthalate units;
wherein weight percents are based on the total weight of the polyester-polycarbonate polymer, the poly(1,4-butylene terephthalate), and the poly(ethylene terephthalate)-co-poly(1,4-cyclohexyldimethylene terephthalate); and further wherein an article molded from the composition has a percent haze value of less than or equal to 10 percent, and a total luminous transmittance value of greater than or equal to 70 percent, each measured according to ASTM D1003-00.

43. The composition of claim 42, further comprising a quencher wherein the quencher is selected from the group consisting of zinc phosphate, mono zinc phosphate, phosphorous acid, phosphoric acid diluted in water, sodium acid pyrophosphate, tetrapropyl orthosilicate, tetrakis-(2-methoxyethoxy) silane), sodium lauryl sulphate, boric acid, citric acid, oxalic acid, a cyclic iminoether containing compound, and a combination thereof.

44. The composition of claim 42, wherein the composition further comprises from zero to less than 10 weight percent of a polymer selected from the group consisting of a polycarbonate, a polyetherimide, and a combination thereof.

45. The composition of claim 42, wherein the composition further comprises from zero to less than 5 weight percent of a polymer selected from the group consisting of a polycarbonate, a polyetherimide, and a combination thereof.

46. A composition comprising
from 55 to 85 weight percent poly(isophthalate-terephthalate-resorcinol ester)-co-(bisphenol-A carbonate);
from 1 to 35 weight percent poly(1,4-butylene terephthalate); and
from 1 to 40 weight percent poly(1,4-cyclohexyldimethylene terephthalate); wherein
weight percents are based on the total weight of the polyester-polycarbonate polymer, the poly(1,4-butylene terephthalate), and the poly(1,4-cyclohexyldimethylene terephthalate); and further wherein an article molded from the composition has a percent haze value of less than or equal to 10 percent, and a total luminous transmittance value of greater than or equal to 70 percent, each measured according to ASTM D1003-00.

47. The composition of claim 46, wherein the composition further comprises from zero to less than 10 weight percent of a polymer selected from the group consisting of a polycarbonate, a polyetherimide, and a combination thereof.

48. The composition of claim 46, wherein the composition further comprises from zero to less than 5 weight percent of a polymer selected from the group consisting of a polycarbonate, a polyetherimide, and a combination thereof.

49. The composition of claim 46, further comprising a quencher wherein the quencher is selected from the group consisting of zinc phosphate, mono zinc phosphate, phosphorous acid, phosphoric acid diluted in water, sodium acid pyrophosphate, tetrapropyl orthosilicate, tetrakis-(2-methoxyethoxy)silane), sodium lauryl sulphate, boric acid, citric acid, oxalic acid, a cyclic iminoether containing compound, and a combination thereof.

50. The composition of claim 46, wherein the composition further comprises from zero to less than 10 weight percent of a polymer selected from the group consisting of a polycarbonate, a polyetherimide, and a combination thereof.

51. The composition of claim 46, wherein the composition further comprises from zero to less than 5 weight percent of a polymer selected from the group consisting of a polycarbonate, a polyetherimide, and a combination thereof.

52. A method of forming a composition comprising melt blending the components of the composition of claim 1.

53. The method of claim 52, further comprising shaping, extruding, or molding the melt blended composition.

54. The method of claim 52, further comprising molding the melt blended composition.

55. An article comprising the composition of claim 1.

56. A molded article comprising the composition of claim 6.

57. A molded article comprising the composition of claim 38.

58. A molded article comprising the composition of claim 42.

59. A molded article comprising the composition of claim 46.

60. The article of claim 55, wherein the article is a fiber, a film, or a sheet.

61. The article of claim 56, wherein the article is a fiber, a film, or a sheet.

62. The article of claim 57, wherein the article is a fiber, a film, or a sheet.

63. The article of claim 58, wherein the article is a fiber, a film, or a sheet.

64. The article of claim 59, wherein the article is a fiber, a film, or a sheet.

* * * * *